United States Patent Office 3,833,601
Patented Sept. 3, 1974

3,833,601
CERTAIN 4-CHLOROTHIAZOLES AND PROCESS FOR PREPARING SAME
Günther Beck and Hans Holtschmidt, Leverkusen, Germany, assignors to Bayer Aktiengesellschaft, Leverkusen, Germany
No Drawing. Filed Mar. 2, 1973, Ser. No. 337,611
Claims priority, application Germany, Mar. 22, 1972, P 22 13 865.4
Int. Cl. C07d 91/32
U.S. Cl. 260—302 R                    4 Claims

ABSTRACT OF THE DISCLOSURE

Chlorothiazoles having the formula:

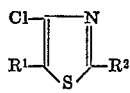

wherein $R^1$ is chlorine,

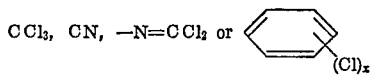

where $x$ is 0, 1 or 2; and $R^2$ is chlorine,

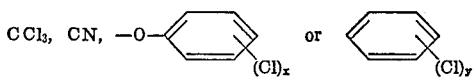

where $x$ is as defined above and $y$ is a number from 0 to 5 are prepared by reacting compounds having the formula:

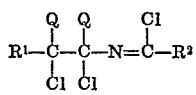

wherein $R^1$ and $R^2$ are as defined above and Q is chlorine or together represent a C—C— bond; with substantially the stoichiometrically necessary quantity of sulphur at a temperature in the range of from 150 to 350° C. Such chlorothiazoles can be used for the production of plant protection agents, especially as insecticides.

---

This invention relates to novel chlorothiazoles and to a process for their production.

SUMMARY

It has been found that chlorothiazoles are obtained by reacting compounds corresponding to the general formula (I):

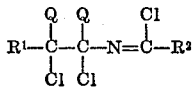  (I)

in which:
$R^1$ represents chlorine, $CCl_3$, CN, —N=$CCl_2$ or the radical

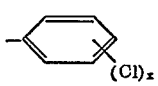

in which $x$ is 0, 1 or 2;
$R^2$ represents chlorine,

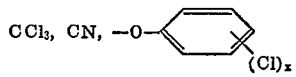

or the radical

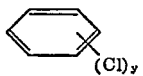

where $x$ is as defined above whilst
$y$ is 0 or an integer from 1 to 5 inclusive
Q represents chlorine and the two radicals Q together can also represent an additional C—C bond;

with substantially the stoichiometrically necessary quantity of sulphur at a temperature in the range from 150 to 350° C.

DESCRIPTION

The reaction is preferably carried out at a temperature in the range from 180 to 280° C. The quantity of sulphur used is governed by the constitution of the starting compound. Where both radicals Q together represent a C—C— bond, it is best to use about 3 mols of sulphur per mol of the starting compound. On the other hand, where Q represents chlorine, it is best to use about 5 mols of sulphur per mol of the starting compound.

The process according to the invention is illustrated by the following examples:

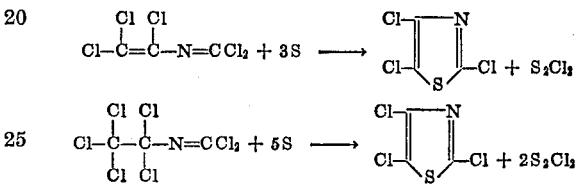

The new compounds which can be obtained by the process according to the invention correspond to the general formula (II):

  (II)

in which the radicals $R^1$ and $R^2$ are as defined above.

The starting compounds used for the process according to the invention are known and can be obtained by known methods (for example, Neuere Methoden Prap. Org. Chem., 1970, Vol. 6, 1). The following are mentioned as examples of starting compounds used in the process according to the invention:

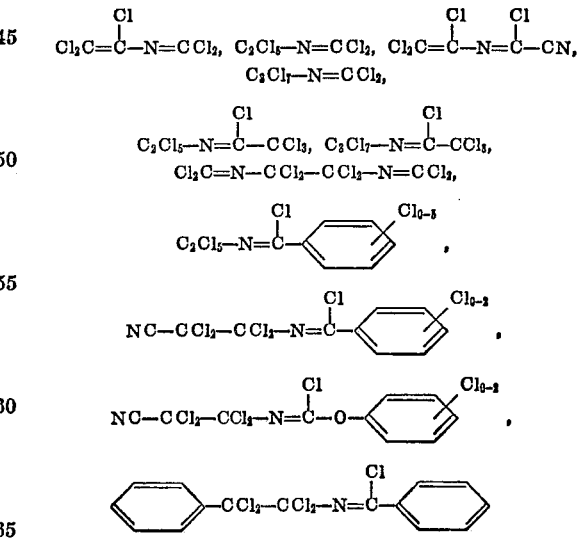

It should be pointed out that some of the starting compounds mentioned above are formulated in a chlorotropic constitution in the literature (Liebigs Ann. Chem., 701, 107 (1967)). For example, the compound in which $R^1$ and Q both represent chlorine whilst $R^2$ represents phenyl, is described in the following form (a). In the process accord to the invention, however, it reacts in the non-chlorotropic form (b):

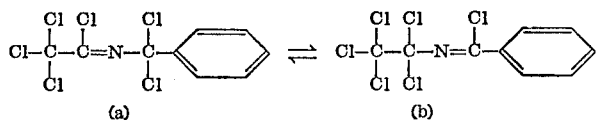

To carry out the process according to the invention, the starting compound is mixed with substantially the stoichiometrically necessary quantity of sulphur and the resulting mixture is heated to the particular reaction temperature, preferably to a temperature of from 180 to 280° C. It is, of course, also possible to use a molar ratio of starting compound to sulphur different from those quoted above and, in this case, optionally to return the particular component in excess to the reaction mixture. The reaction can be carried out in an open or closed reaction vessel. Where the reaction is carried out in a closed vessel, for example in an autoclave or a bomb tube, the starting components are heated for from 1 to 10 hours to a temperature in the aforementioned range and, after cooling, the disulphur dichloride formed is separated off (together with a smaller quantity of sulphur dichloride), for example by fractional distillation.

Where the reaction is carried out in an open vessel, the sulphur chlorides formed are preferably distilled off continuously in order to be able to keep the reaction temperature at the required level and hence to obtain as complete a conversion as possible. The reaction is finished when no more sulphur chlorides distil over. In this case, too, the reaction time is from 1 to 10 hours, depending upon the size of the batch. In order to prevent unreacted starting material from distilling over with the sulphur chlorides formed, it is advantageous to arrange a column in between.

In general, the process is carried out in the absence of solvents, although it can also be carried out in the presence of organic solvents which boil in the temperature range used and which are inert with respect to the reactants, for example naphthalene, methylnaphthalenes, acenaphthylene and the like. The process can of course also be carried out continuously.

The new chlorothiazoles obtained by the process according to the invention can be used for the production of plant-protection agents, especially as insecticides as shown in the following tests.

Myzus test (contact effect)

Solvent: 3 parts by weight of dimethyl formamide
Emulsifier: 1 part by weight of alkylaryl polyglycol ether.

In order to prepare a suitable active-substance preparation, 1 part by weight of the active substance is mixed with the specified quantity of solvent containing the specified quantity of emulsifier, and the concentrate is diluted with water to the required concentration.

Cabbage plants (Brassica oleracea) heavily infested by peach aphis (Myzus persicae) are sprayed until dripping wet with the active-substance preparation.

The mortality rate in percent is measured after the interval specified. 100% means that all the aphides were killed, 0% means that none of the aphides were killed.

The active substance, active substance concentration, evaluation period and result are set out in the following Table:

| Active substance | Active substance concentration in percent | Mortality rate in percent after 1 day |
|---|---|---|
| 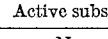 | 0.1 | 20 |

The other new compounds obtainable by the process also show a comparable activity.

Drosophila test

Solvent: 3 parts by weight of dimethyl formamide
Emulsifier: 1 part by weight of alkylaryl polyglycol ether.

To prepare a suitable active substance preparation, 1 part by weight of the active substance is mixed with the specified quantity of solvent containing the specified quantity of emulsifier, and the concentrate is diluted with water to the required concentration.

1 cc. of the active substance preparation is pipetted onto a circular filter paper 7 cm. in diameter. While still wet the filter paper is placed on a glass dish containing 50 dew flies (Drosophila melanogaster) and covered with a glass plate.

The mortality rate in percent is measured after the interval specified. 100% means that all the flies were killed, 0% means that none of the flies were killed.

The active substance, active substance concentrations, evaluation period and mortality rates are set out in the following Table:

| Active substance | Active substance concentration in percent | Mortality rate in percent after 1 day |
|---|---|---|
| 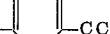 | 0.1 | 100 |
|  | 0.01 | 100 |
| 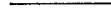 | 0.1 | 98 |

The other new compounds obtainable by the process also show a comparable activity.

Plutella test

Solvent: 3 parts by weight of dimethyl formamide
Emulsifier: 1 part by weight of alkylaryl polyglycol ether.

To prepare a suitable active-substance preparation, 1 part by weight of the active substance is mixed with the specified quantity of solvent containing the specified quantity of emulsifier, and the concentrate is diluted with water to the required concentration.

Cabbage leaves (Brassica oleacea) are sprayed with the active substance preparation until dew-moist, after which caterpillars of the cabbage moth (Plutella maculipennis) are placed on them.

The mortality rate in percent is measured after the period specified. 100% means that all the caterpillars were killed whilst 0% means that none of the caterpillars were killed.

The active substance, active substance concentration, evaluation period and results are set out in the following Table:

| Active substance | Active substance concentration in percent | Mortality rate in percent after 3 days |
|---|---|---|
| 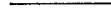 | 0.1 | 70 |

The other new compounds obtainable by the process also show comparable activity.

Tetranychus–Test (resistant)

Solvent: 3 parts by weight of dimethyl formamide
Emulsifier: 1 part by weight of alkylaryl polyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites were killed whereas 0% means that none of the spider mites are killed.

The active compounds, the concentrations of the active compounds, the evaluation times and the results can be seen from the following Table:

| Active substance | Active substance concentration in percent | Mortality rate in percent after 2 days |
|---|---|---|
| 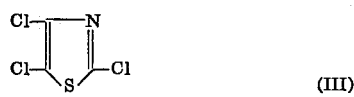 | 0.1 | 80 |

EXAMPLE 1

596 g. (2.0 mols) of pentachloroethyl isocyanide dichloride and 320 g. (10.0 mols) of sulphur are initially heated under reflux for 2 hours by means of a metal bath at approximately 250° C. in a glass flask provided with a 50 cm. tall packed column with a silver jacket and dephlegmator. Owing to the formation of the sulphur chlorides, the internal temperature falls from an initial value of about 203° C. to approximately 186° C. At the same time, the head temperature in the column falls to about 80° C. The sulphur chlorides formed are then distilled off at a bath temperature of about 210° C. and with a reflux ratio of about 10:1, up to a boiling point of about 142° C. The operation of heating under reflux with a bath at about 250° C. (approximately 1 to 2 hours), followed by removal of freshly formed sulphur chlorides by distillation up to about 140–145° C., is repeated a few times until no more sulphur chlorides are formed. After an intermediate fraction (120 g.) of b.p. 145–198° C., 241 g. (64% of the theoretical) of 2,4,5-trichloro thiazole corresponding to the formula (III):

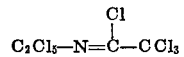

(III)

are obtained, having a b.p. of 198–201° C. in the form of an oil which is substantially colourless except for some tinges of yellow.

From the intermediate fraction (120 g.) which, apart from the 2,4,5-trichloro thiazole, only contains disulphur dichloride it is possible, by destroying the disulphur dichloride with warm water and by shaking with methylene chloride, for example, followed by redistillation, to isolate about another 60 g. of 2,4,5-trichloro thiazole, giving a total yield of about 80%.

Heating and fractionation of the sulphur chlorides can, of course, also be carried out at the same time in a correspondingly larger column, instead of in two stages.

EXAMPLE 2

587 g. (2.58 mols) of trichlorovinyl isocyanide dichloride (prepared in accordance with British Pat. No. 1,222,188) are heated for 8 hours to 260° C. with 256 g. (8.0 mols) of sulphur in a 1.3-litre nickel autoclave. The maximum spontaneous pressure amounts to 12 atms. After fractionation in a 75 cm. tall packed silver-jacket column at from 198 to 201° C., 2,4,5-trichloro thriazole, identical with the compound of Example 1, is obtained in a yield of 322 g. (66% of the theoretical). By working up the intermediate fraction of b.p. 140–198° C. in the same way as described in Example 1, it is possibel to iso-late another 48 g. of 2,4,5-trichloro thiazole, giving a total yield of 76% of the theoretical.

EXAMPLE 3

381 g. (1.0 mol) of

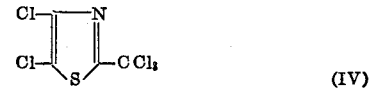

and 160 g. (5.0 mols) of sulphur are kept for about 5 hours at an internal temperature of from 225–230° C. in a three-necked flask equipped with a stirrer, thermometer and distillation bridge, sulphur chlorides (predominantly disulphur dichloride) continuously distilling off. After fractionation in the usual way in a column, 193 g. (71% of the theoretical) of 4,5-dichloro-2-trichlormethyl thiazole corresponding to the formula (IV):

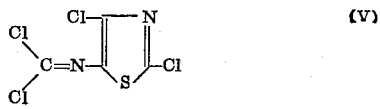

(IV)

are obtained, having a b.p. of 130–131° C./13 Torr and in the form of an almost colourless oil.

EXAMPLE 4

360 g. (1.0 mol) of $Cl_2=N-CCl_2-CCl_2-N=CCl_2$ and 160 g. (5.0 mols) of sulphur, accommodated in a plain spherical flask equipped with a distillation bridge, are kept for 6 hours in a metal bath at about 210° C., sulphur chlorides continuously distilling off. Subsequent fractionation gives 132 g. of a liquid having a b.p. of 138–144° C./2.1–2.5 Torr. The liquid thus obtained partially solidifies when stored in a refrigerator. Recrystallisation of the solids fraction from petroleum ether gives about 60 g. (24% of the theoretical) of 2,4-dichloro-5-(dichloromethylene amino)-thiazole corresponding to the formula (V):

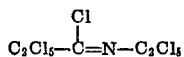

(V)

in the form of colourless needles melting at 53–53.5° C.

EXAMPLE 5

25 g. (0.054 mol) of

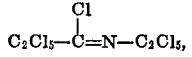

and 8.6 g. (0.27 mol) of sulphur are kept for about 3 hours at a reaction temperature of from 210 to 215° C. in an apparatus of the kind described in Example 3, sulphur chlorides continuously distilling off. After the residual sulphur chlorides have been distilled off in a boiling water bath at 14 Torr, 15 g. (76% of the theoretical) of 4-chloro-2,5-bis-trichloromethyl thiazole corresponding to the formula (VI):

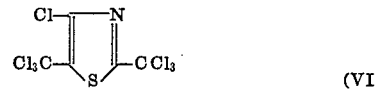

(VI)

are left behind. Recrystallisation from petroleum ether gives colourless slabs melting at 98 to 100° C.

The starting compound

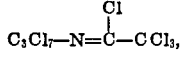

which as mentioned above reacts in the chlorotropic form $$C_3Cl_7-N=\overset{Cl}{\underset{|}{C}}-CCl_3,$$

was obtained as follows:

163.5 g. of dipropyl carbamic acid chloride are heated for 1 hour to 100° C. in ultraviolet light while introducing chlorine. Chlorination is then continued in the following temperature ranges: 4.5 hours at from 100–120° C., 3.5 hours at from 140–160° C., 4 hours at from 180–200° C. and 1 hour at 220° C. Following the addition of 1.5 g. of iron (III) chloride, chlorination is then continued for 4 hours at from 180–200° C. and for 3 hours at from 210–220° C. Nitrogen is blown in and the product is subsequently distilled in an oil pump vacuum. The distillate is fractionated in a column. 160 g. of crude N-pentachloroethyl pentachloropropionimide acid chloride are obtained having a b.p. of 163–178° C./0.15 Torr, solidifying in the form of colourless crystals on cooling. M.p. after crystallisation from acetonitrile 114° C.

EXAMPLE 6

68 g. (0.2 mol) of

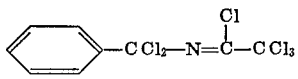

and 32 g. (1 mol) of sulphur are kept for 7 hours at a reaction temperature of from 200 to 205° C. as described in Example 3, sulphur chlorides continuously distilling off. The residual sulphur chlorides are removed under a water jet vacuum in a boiling water bath. Subsequent fractionation gives 42 g. (91% of the theoretical) of 4,5-dichloro-2-phenyl thiazole corresponding to the formula (VII):

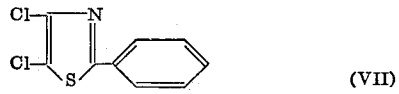 (VII)

at b.p. 129° C./0.05 Torr. Recrystallisation from petroleum ether leaves colourless prisms melting at 52 to 53° C.

EXAMPLE 7

105 g. (0.276 mol) of the compound

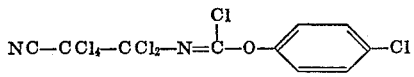

and 44 g. (1.38 mol) of sulphur are heated for about 5.5 hours to 225° C. as described in Example 6. Working up in the same way gives 62 g. (83% of the theoretical) of 4-chloro-5-cyano-2-(p - chloro phenoxy) - thiazole corresponding to the formula (VIII):

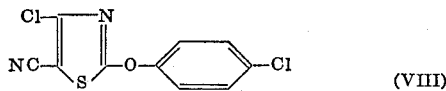 (VIII)

melting point: 123 to 125° C. (from cleaning spirit).

The starting compound used was obtained as follows: 3 g. of iron (III) chloride are added to 67.5 g. (0.5 mol) of dichloromalonic acid dinitrile and 123 g. (0.5 mol) of p-chloro trichloromethoxy benzene in a 250 ml. capacity three-necked flask equipped with a stirrer and reflux condenser, a weakly exothermic reaction beginning with gradual heating at about 70° C. The internal temperature is increased to 120° C., followed by stirring for 30 minutes. Subsequent distillation gives 168 g. (88% of the theoretical) of 1,3,3,4,4-pentachloro-4-cyano1-1(p-chloro phenoxy)-2-aza-1-butene of b.p. 158 to 162° C./0.25 Torr.

What we claim is:
1. Chlorothiazole having the formula:

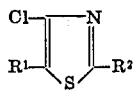

wherein $R^1$ is chlorine,

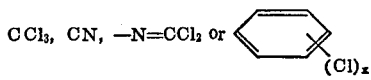

wherein $x$ is 0, 1 or 2; and $R^2$ is chlorine,

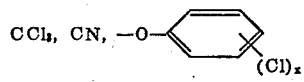

or

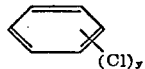

where $x$ is as defined above and $y$ is 0 or an integer from 1 to 5 inclusive

2. Chlorothiazole of Claim 1 selected from the group of the following:

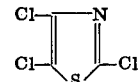

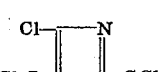

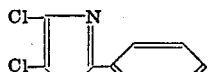

and

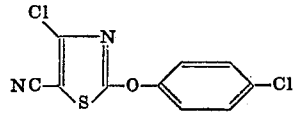

3. Process for preparing a chlorothiazole which comprises reacting a compound having the formula:

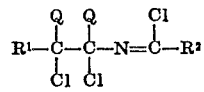

wherein $R^1$ is chlorine,

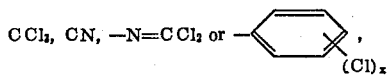

where $x$ is 0, 1 or 2; $R^2$ is chlorine,

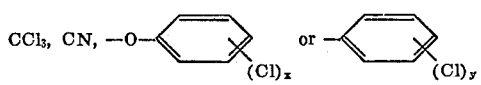

where $x$ is as defined above and $y$ is an integer from 0 to 5 inclusive; and Q represents chlorine or the two radicals Q together represent a C—C— bond; with substantially the stoichiometrically necessary quantity of sulphur at a temperature in the range of from 150 to 350° C.

4. Process of Claim 3, wherein the reaction is carried out at a temperature in the range of from 180 to 280° C.

References Cited

Eldgrfield (ed.), Heterocyclic Compounds, vol. 5 (New York, John Wiley & Sons), 1957, pp. 537, 545.

RICHARD J. GALLAGHER, Primary Examiner

U.S. Cl. X.R.

260—206.8 R; 424—270

UNITED STATES PATENT OFFICE
CERTIFICATE OF CORRECTION

Patent No. 3833601          Dated September 3, 1974

Inventor(s) Gunther Beck et al

It is certified that error appears in the above-identified patent and that said Letters Patent are hereby corrected as shown below:

Col. 3, line 1    "accord" should read -- according --.

Col. 7, line 37    "NC-CCl$_4$" should read -- NC-CCl$_2$ --.

Signed and sealed this 3rd day of December 1974.

(SEAL)
Attest:

McCOY M. GIBSON JR.          C. MARSHALL DANN
Attesting Officer          Commissioner of Patents